(12) United States Patent
Kiselev

(10) Patent No.: US 6,839,740 B1
(45) Date of Patent: Jan. 4, 2005

(54) SYSTEM AND METHOD FOR PERFORMING VIRTUAL DEVICE I/O OPERATIONS

(75) Inventor: Oleg Kiselev, Palo Alto, CA (US)

(73) Assignee: Veritas Operating Corporation, Mountain View, CA (US)

(*) Notice: Subject to any disclaimer, the term of this patent is extended or adjusted under 35 U.S.C. 154(b) by 168 days.

(21) Appl. No.: 10/330,378

(22) Filed: Dec. 27, 2002

(51) Int. Cl.$^7$ ............................................. G06F 15/167
(52) U.S. Cl. .................................... 709/214; 711/148
(58) Field of Search ............................... 711/114, 147, 711/148; 709/213, 214

(56) References Cited

U.S. PATENT DOCUMENTS

| | | | |
|---|---|---|---|
| 5,964,886 A | 10/1999 | Slaughter et al. | 714/4 |
| 6,161,191 A | 12/2000 | Slaughter et al. | 714/4 |
| 6,421,787 B1 | 7/2002 | Slaughter et al. | 714/4 |
| 2003/0172149 A1 * | 9/2003 | Edsall et al. | 709/224 |
| 2003/0191904 A1 * | 10/2003 | Iwami et al. | 711/147 |
| 2003/0236945 A1 * | 12/2003 | Nahum | 711/114 |
| 2004/0117369 A1 * | 6/2004 | Mandal et al. | 707/8 |
| 2004/0148380 A1 * | 7/2004 | Meyer et al. | 709/223 |

* cited by examiner

Primary Examiner—Hiep T. Nguyen
(74) Attorney, Agent, or Firm—Campbell Stephenson Ascolese LLP; Marc R. Ascolese

(57) ABSTRACT

Systems, methods, apparatus and software can make use separated I/O processors and strategy processors in performing virtual device I/O operations. I/O processors operating on cluster nodes, storage appliance ports, or other devices can receive I/O operation requests directed to virtual devices, e.g., volumes or virtual logical units. Information about the request is forwarded to a strategy processor, operating independently or as part of larger volume management software where corresponding physical device I/O operations are determined. The physical device I/O operations are sent back to the I/O processor which executes the operations and/or passes the operation on to the appropriate storage device.

9 Claims, 5 Drawing Sheets

SYSTEM AND METHOD FOR PERFORMING VIRTUAL DEVICE I/O OPERATIONS

FIELD OF THE INVENTION

The present invention relates to the field of distributed computer systems and, more particularly, to enhancing storage virtualization schemes in distributed computer systems.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

FIG. 1 illustrates a simplified example of a cluster 100. The members of the cluster include Server A 140 and Server B 145. As members of cluster 100, servers 140 and 145 are often referred to as "hosts" or "nodes." Thus, a node in a computer cluster is typically an individual computer system having some or all of the software and hardware components illustrated and as is well known in the art. FIG. 5 (described below) illustrates some of the features common to cluster nodes. Another common feature of a cluster is the ability of the nodes to exchange data. In the example of FIG. 1, servers 140 and 145 can exchange data over network 120, typically a local area network (LAN), e.g., an enterprise-wide intranet, or a wide area network (WAN) such as the Internet. Additionally, network 120 provides a communication path for various client computer systems 110 to communicate with servers 140 and 145. In addition to network 120, servers 140 and 145 can communicate with each other over private network 130. As shown, private network 130 is only accessible by cluster nodes, i.e., Server A 140 and Server B 145. To support the high availability of cluster 100, private network 130 typically includes redundancy such as two network paths instead of one. Private network 130 is used by the nodes for cluster service message passing including, for example, the exchange of so-called "heart-beat" signals indicating that each node is currently available to the cluster and functioning properly. Similar functions can be implemented using a public network.

Other elements of cluster 100 include storage area network (SAN) 150, SAN switch 160, and storage devices such as tape drive 170, storage array 180, and optical drive 190. These devices are examples of the type of storage used in cluster 100. Other storage schemes include the use of shared direct-attached storage (DAS) over shared SCSI buses. As shown in FIG. 1, both servers 140 and 145 are coupled to SAN 150. SAN 150 is conventionally a high-speed network that allows the establishment of direct connections between storage devices 170, 180, and 190 and servers 140 and 145. Thus, SAN 150 is shared between the servers and allows for the sharing of storage devices between the servers to providing greater availability and reliability of storage. SAN 150 can be implemented using a variety of different technologies including fibre channel arbitrated loop (FCAL), fibre channel switched fabric, IP networks (e.g., iSCSI), Infiniband, etc.

SAN switch 160, tape drive 170, storage array 180, and optical drive 190 are all examples of shared resources. The most common shared resource in a cluster is some form of shared data resource, such as one or more disk drives. Using a shared data resource gives different nodes in the cluster access to the same data, a feature that is critical for most cluster applications. Although a disk device (and various related devices such as storage array 180) is perhaps the most common example of both a shared resource and a shared data resource, a variety of other types of devices will be well known to those having ordinary skill in the art. Moreover, although servers 140 and 145 are shown connected to storage array 180 through SAN switch 160 and SAN 150, this need not be the case. Shared resources can be directly connected to some or all of the nodes in a cluster, and a cluster need not include a SAN. Alternatively, servers 140 and 145 can be connected to multiple SANs. Additionally, SAN switch 160 can be replaced with a SAN router or a SAN hub.

One well known problem among computer system clusters is the coordination of input/output (I/O) operations on the shared resources. Since multiple nodes have access to the same data resources, care must be taken to ensure that data is not corrupted, e.g., because of uncoordinated write operations to the same logical or physical portions of a storage device or read operations that do not present data reflecting the most recent updates.

A variety of software mechanisms, as illustrated in FIG. 1, are employed to both enable clustering functionality and prevent data corruption. A cluster volume manager virtualizes shared storage so as to present a consistent view of shared storage, typically in a logical format such as one or more volumes, to all nodes of the cluster. Additionally, a cluster volume manager allows an administrator to configure and reconfigure shared storage. In some implementations, this reconfiguration can be accomplished without interrupting applications' access to the storage. A cluster monitor regularly checks the status or "health" of each node in the cluster to quickly and reliably determine when a node stops functioning (or stops functioning properly) and inform the remaining nodes so that they can take appropriate action. In some embodiments, a cluster messaging service, which can be a part of cluster monitor and/or a separate software or hardware system, exists to quickly and reliably communicate cluster-critical information among the nodes in a secure manner. Finally, a cluster locking mechanism provides distributed locks that are used by instances of a cluster application to achieve proper coordination. In some embodiments, this is achieved through the use of a formalized distributed lock manager. In still other embodiments, the lock management is implemented in an ad hoc fashion using the messaging services to communicate and coordinate the state. These software tools operate in conjunction with applications, database management systems, file systems, operating systems, etc., to provide distributed clustering functionality.

In one approach to I/O coordination, one node is elected as master of all the shared storage and the remaining nodes are slaves. The master node can typically change disk configurations and maintains control over disk areas used for transaction logs. The master node also reads volume management metadata from all of the disks and maintains this mapping between each logical block of the volume and one or more physical blocks of the disks. Slave nodes must obtain copies of this volume management metadata in order to have knowledge of the volume organization. Moreover, if there are changes to the volume configuration, that change must be communicated to all of the slaves using, for example, a messaging protocol and/or a system of shared and exclusive locks on the volume management metadata.

In clustering systems where changes to volume configuration occur frequently, the added system resource overhead needed to make all nodes aware of the changes can be burdensome. Accordingly, it is desirable to have a more scalable and flexible scheme for performing I/O operations on shared resources in a clustering environment.

SUMMARY OF THE INVENTION

It has been discovered that systems, methods, apparatus and software can make use separated I/O processors and strategy processors in performing virtual device I/O operations. I/O processors operating on cluster nodes, storage appliance ports, or other devices can receive I/O operation requests directed to virtual devices, e.g., volumes or virtual logical units. Information about the request is forwarded to a strategy processor, operating independently or as part of larger volume management software where corresponding physical device I/O operations are determined. The physical device I/O operations are sent back to the I/O processor which executes the operations and/or passes the operation on to the appropriate storage device.

Accordingly, one aspect of the present invention provides a method. A virtual device input/output (I/O) operation request is received. Information from the virtual device I/O operation request is extracted. A message using the information from the virtual device I/O operation request is formed. The message is transmitted to a strategy processor.

In another aspect of the present invention, a system includes a first memory and an input/output (I/O) processor. The input/output (I/O) processor is configured to receive a virtual device I/O operation request; store the virtual device I/O operation request in the memory; form a message using information from the virtual device I/O operation request; and transmit the message to a strategy processor.

Yet another aspect of the present invention provides an apparatus including a means for receiving a virtual device input/output (I/O) operation request; a means for forming a message using information from the virtual device I/O operation request; and a means for transmitting the message to a means for strategizing virtual device I/O operation requests.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
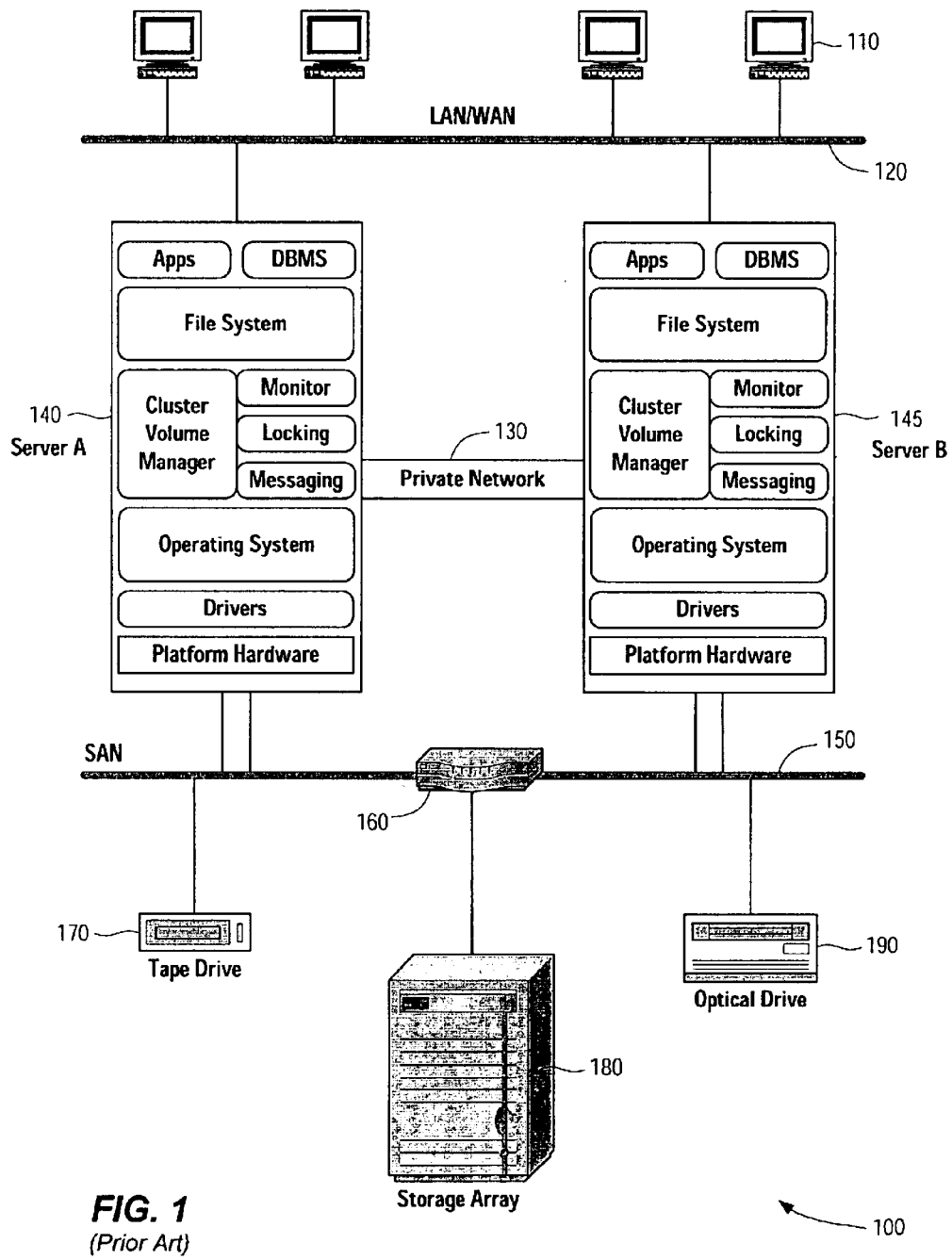
FIG. 1 is a simplified block diagram of a computer system cluster.
Figure 2:
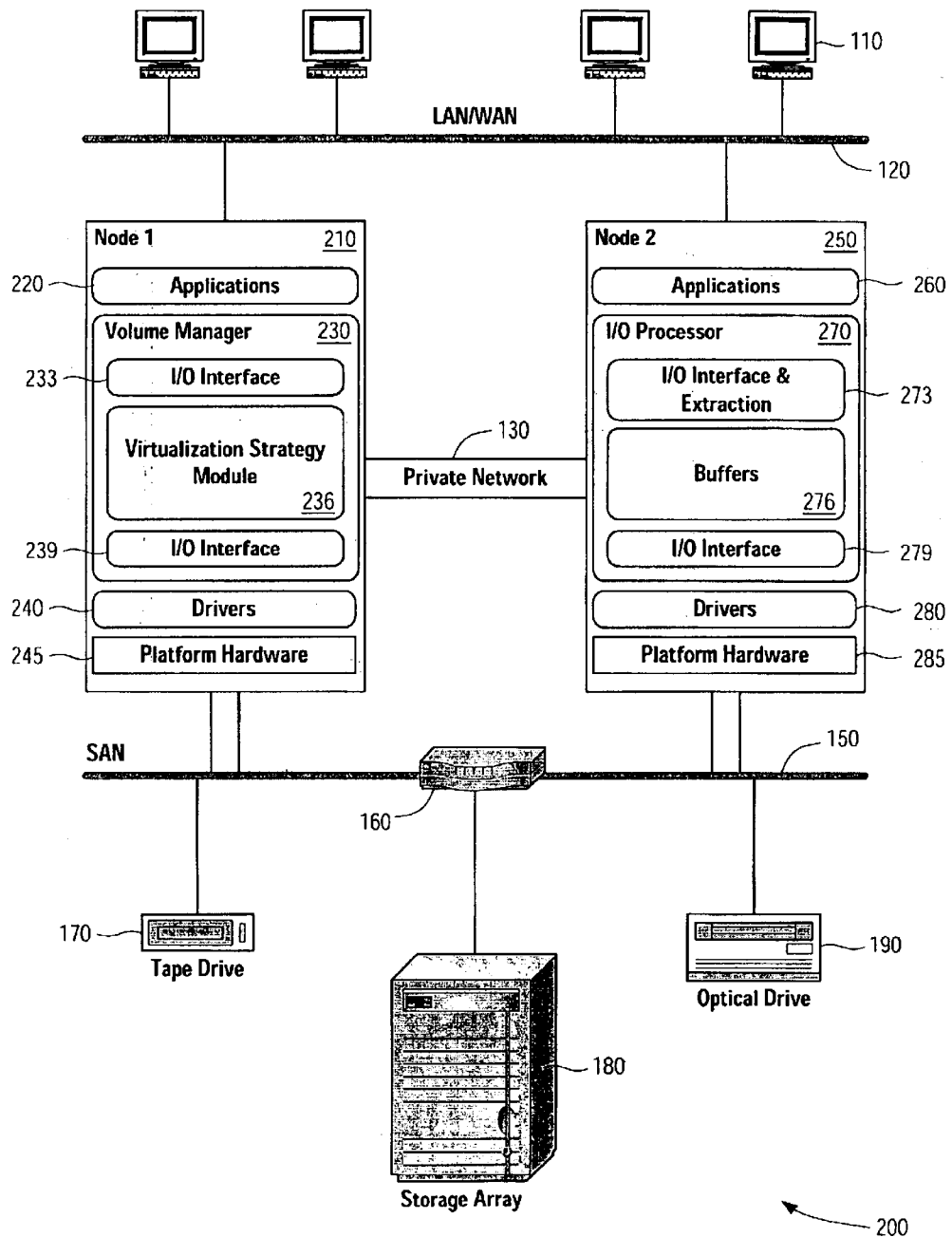
FIG. 2 is a simplified block diagram of computer system cluster utilizing some of the systems and methods of the present invention.

FIG. 2 illustrates a simplified block diagram of computer system cluster 200 utilizing some of the systems and methods of the present invention. In the example of FIG. 2, cluster 200 includes two nodes 210 and 250, in many ways similar to the servers 140 and 145 of FIG. 1. In this example, certain hardware and software components associated with each of the nodes are not shown in order to aid clarity. Both node 1 210 and node 2 250 execute one or more applications 220 and 260 respectively. Such applications can include, but are not limited to, database administration systems (DBMS), file servers, application servers, web servers, backup and restore software, customer relationship management software, and the like. The applications 220 and 260, other node software not shown, e.g., operating systems, and file systems, and applications executing on client computer systems 110 can initiate or request that I/O operations be executed against storage devices such as tape drive 170, storage array 180, and optical drive 190. These I/O operations typically include read and write operations to logical or virtual devices such as volumes, physical disk or flash memory devices attached over SCSI, IDE or other means, and virtual logical units (LUNs) designed to appear and operate as SCSI LUNs.

Node 1 210 includes a complete volume manager 230 implementation that provides core storage virtualization services such as those provided by conventional volume managers. Volume manager software enables physical resources configured in the computer system to be managed as logical devices or volumes. Software such as volume manager 230 can be part of the operating system executing on node 210, or it can comprise one or more specialized components such as the VERITAS Volume Manager™ product provided by VERITAS Software Corporation. In addition to the typical volume management functions provided by volume manager 230, specialized functions as implemented by I/O interface 233, used by applications to access logical volumes, virtual LUNs or other virtual device metaphors exported by a volume manager, virtualization strategy 236, and I/O interface 239 are also included. Although illustrated as part of volume manager 230, I/O interface 233 (used by a volume manager to issue I/Os to storage devices), virtualization strategy 236, and I/O interface 239 can be implemented as separate modules that work in conjunction with volume manager 230. I/O interface 233 can distinguish between I/O operation requests that are directly associated with node 1 210, e.g., requests from applications 220 and requests from client computer systems 110 but directed to node 1 210, and remote I/O operation requests received from other nodes such as node 2 250.

In another embodiment, virtualization strategy 236, rather than or in addition to I/O interface 233, can distinguish between I/O operation requests that are directly associated with node 1 210 and remote I/O operation requests received from other nodes. Thus, virtualization strategy 236 can receive I/O operation requests from I/O interface & extraction 273 of node 2 250. Processed I/O operation requests can then be directly routed back to I/O interface 279 of node 2 250, rather than being passed through I/O interface 239 of node 1 210.

In still another embodiment, node 1 210 need not need have its own application-accessible I/O interfaces, e.g., I/O interfaces 233 or 239. Instead, node 1 210 can perform its I/O operations "by proxy." For example, node 1 210 can transfer data to I/O-dedicated nodes, such as node 2 250, and then inform such nodes how to write the data to storage devices. Similarly, node 1 210 can request such node's I/O engine to allocate memory and then inform the node how to read data from the storage devices into memory and transfer the contents of memory back to node 1 210.

Node 2 250 is illustrated as not having a complete volume manager, but instead includes an I/O processor 270 designed to operate in conjunction with I/O interface 233, virtualization strategy 236, and I/O interface 239 of volume manager 230. In general, node 2 250 can include more complete volume manager software, but that additional functionality is typically not used. For example, virtualization of shared storage (e.g., layout information for virtual devices), volume configuration, volume reconfiguration, and volume management functions for all nodes in cluster 200 are handled by volume manager 230. Thus, volume manager 230 coordinates I/O streams for all nodes in the cluster and manages volume manager metadata. Concentrating this functionality in a single node provides a single point for critical I/O decisions to be made and enhance the ability of the cluster to scale in size. In some implementations, volume manager 230 serves only to manage I/O operations from other nodes, i.e., it is configured to process and/or receive I/O operation requests directly. In this manner, a single supervisory node for the entire cluster can be implemented.

I/O processor 270 presents the appearance of virtual devices such as volumes or virtual LUNs to applications 260, other software operating on node 2 250, and applications operating on client computer systems 110 that interact with node 2 250. However, when a request for a virtual device I/O operation is sent to I/O processor 270, I/O interface & extraction 273 receives the request and extracts information about the request. That information can include, for example, the virtual device destination for the I/O operation, information about data associated with the operation (e.g., size of data to be written, buffer addresses for data to be written), and any other metadata useful for completion of the I/O operation. I/O interface & extraction 273 prepares a message including this information and transmits that message to volume manager 230. Additionally, I/O interface & extraction 273 will also typically allocate buffer space in buffers 276 in order to, for example, provide a place to temporarily store data to be written to a storage device and to provide a place to temporarily store data read from a storage device.

In some embodiments, additional information about the I/O operation request can be sent to the I/O processor. Such information can include, but is not limited to: (1) for systems that cache data, information ("hints") about cache management such as an instruction not to retain the data because the application knows the data will not be needed again very soon, and an instruction to "cache until further notice" for systems where an I/O operation request to read the same data is expected from a cooperating application on another remote host; (2) I/O priority information, e.g., some I/O operation requests can be prioritized as opportunistic and asynchronous rather than immediately performed; (3) desired latency of I/O operation completion for real-time applications like telemetry storage or video streaming, and/or instructions to drop the current I/O operation and return an error if the I/O operation does not complete in a specified amount of time; (4) for storage systems that can perform encryption and decryption of the I/O stream, user or application-specific cryptographic keys for use with the data; (5) "do not retry" directives for high priority I/O operations so that the storage system responds to the application with the result of its first attempt to perform the I/O operation even if it encounters a correctable or retriable error; and (6) for storage systems that can inform the application that the storage is mirrored or versioned, an instruction to the storage system to send a specific I/O to a specific mirror, copy or version of the data.

Once a message is received from another node and identified as a remote I/O request, virtualization strategy module 236 creates one or more physical device I/O operations to be passed back to I/O processor 270 for execution. Virtualization strategy module 236 determines the proper physical device I/O operations using the information received from I/O processor 270, e.g., a virtual device destination, and information about the virtualization of shared storage in the cluster, and creates a refined and decomposed request to send back to I/O processor 270. Because virtualization strategy module 236 is part of node 1 210, it has access to the necessary volume/virtual-LUN information. Node 2 250 need not be updated with such information, and any resource locking needed to prevent data corruption can be handled by node 1 210.

For example, the message from I/O processor 270 might indicate a request to read (as resolved by, for example, a file system) logical blocks 0–99 of volume A. Node 2, 250 and I/O processor 270 generally have no information about the physical location of that data. Instead, virtualization strategy module 236 uses a description of the storage virtualization scheme to prepare physical device I/O operations that will read the desired data, e.g. read blocks 0–24 from disk A and blocks 25–49 from disk B. These physical device I/O operations are passed back to I/O processor 270. I/O interface 279 performs these operations by, for example, passing them on to device drivers 280, which in turn use platform hardware 285, e.g., a host bus adapter, to present the commands to the appropriate storage device. Alternately, I/O interface 279 may further interpret the physical device I/O operations to perform the requested I/O operation.

The set of physical I/O transfer commands produced by virtualization strategy module 236 and sent to I/O processor 270 to perform on data can be arbitrarily complex and can include, but is not limited to, instructions that accomplish I/O operations to striped, mirrored, and concatenated storage as well as other storage geometries. In some implementations, virtualization strategy module 236 can instruct I/O processor 270 to write additional data associated with the I/O operation request being processed, such as data to a change or data log, or writing a change map associated with the I/O operation. In other implementations, the virtualization strategy module 236 can require a series of read and write operations that will repair or refresh mirrored data, or write data to multiple locations on the storage devices to facilitate data migration and reorganization. In still other implementations, the virtualization strategy module 236 can also instruct I/O processor 270 to perform certain computations on the data. These computations can include, but are not limited to, encryption of data, calculation of checksums, recalculation of RAID-5 parity, and generation of error correction information.

In an alternate embodiment, volume manager 230 passes all I/O operation requests through virtualization strategy module 236, and determines whether the request was a remote request, i.e., whether the resulting physical device I/O operations should be sent to another node or passed to drivers 240, only after the I/O operation is fully strategized. Moreover, because all I/O strategizing is handled by one node, other operations that are performed in support of volume management, e.g., mirroring, first write logging, and dirty region logging, are safely handled by one entity. There is no need for complicated distributed locking mechanisms, distributed transactions, or distributing the state of the virtualization scheme. In general, I/O processor 270 (or multiple I/O processors if there are multiple nodes or more than one I/O processor per node) need have no information about any of the other nodes. The I/O processor need only know to which node it must send a remote request.

The messages that are passed between node 1 210 and node 2 250 can be carried along private network 130, LAN/WAN 120, or via some communication means not illustrated. In general, it is desirable to ensure a minimum level of service, e.g., latency and bandwidth, for the communication of I/O operation requests so that overall system performance is not degraded. Additionally, although buffers 276 are typically used to store data to be written and/or that has been read, other memory structures (not illustrated) can be used for the same purpose.

FIG. 2 illustrates application of novel systems and methods for performing virtual device I/O operations to host-based storage virtualization. Host-based storage virtualization is perhaps the most common virtualization solution and is termed "host-based" because virtualization is implemented at the host computer system, e.g., server, level. Host-based virtualization is typically either packaged with the operating system or made available as an add-on product. Host-based virtualization allows administrators to access advanced storage management functions such as mirroring, RAID sets, redundant pathing, and hot backups (by using mirror splits or snap-shots). However, it adds some additional overhead to the host system and the management of the virtualization, at least in prior art solutions, is typically performed on a host-by-host basis, making global storage management difficult.

An alternative to host-based virtualization is storage-based virtualization. Storage-based virtualization solutions typically implement intelligent storage devices such as intelligent storage arrays that implement virtualization functions. For example, such devices can allow for movement between different RAID groups without data loss, as well as automatic migration of data from one RAID group to another based upon the frequency of data access. In addition, these products typically permit the creation of multiple data mirrors, which provide additional availability when one of the mirrors is split for hot backups. Storage-based virtualization can also be advantageous in providing the flexibility to modify LUN size, the ability to have multiple hosts see the same LUNs (which is particularly critical with high availability clustering), and remote replication.

Still another alternative to host-based virtualization is appliance-based virtualization. Appliance-based virtualization provides users with virtualization between the hosts and the storage. Using a storage appliance such as a specialized switch, router, server, or other storage device, appliance-based virtualization allows for the same level of control and centralization across the storage architecture. There are two kinds of appliance-based virtualization products: in-band and out-of-band. An in-band virtualization appliance is physically located between the host and the storage. The appliance takes the disk requests from the host and fulfills the host's request from the storage attached to the other side of the appliance. This functionality is essentially transparent to the host because the appliance presents itself as disk. The physical location of the appliance is the primary difference between out-of-band and in-band appliances. Out-of-band appliances logically present themselves as if they are located between the host and storage, but they actually reside to the side. This is accomplished with the installation of a driver under the host's disk driver. The appliance driver then receives logical to physical block mappings from the appliance.

Figure 3:
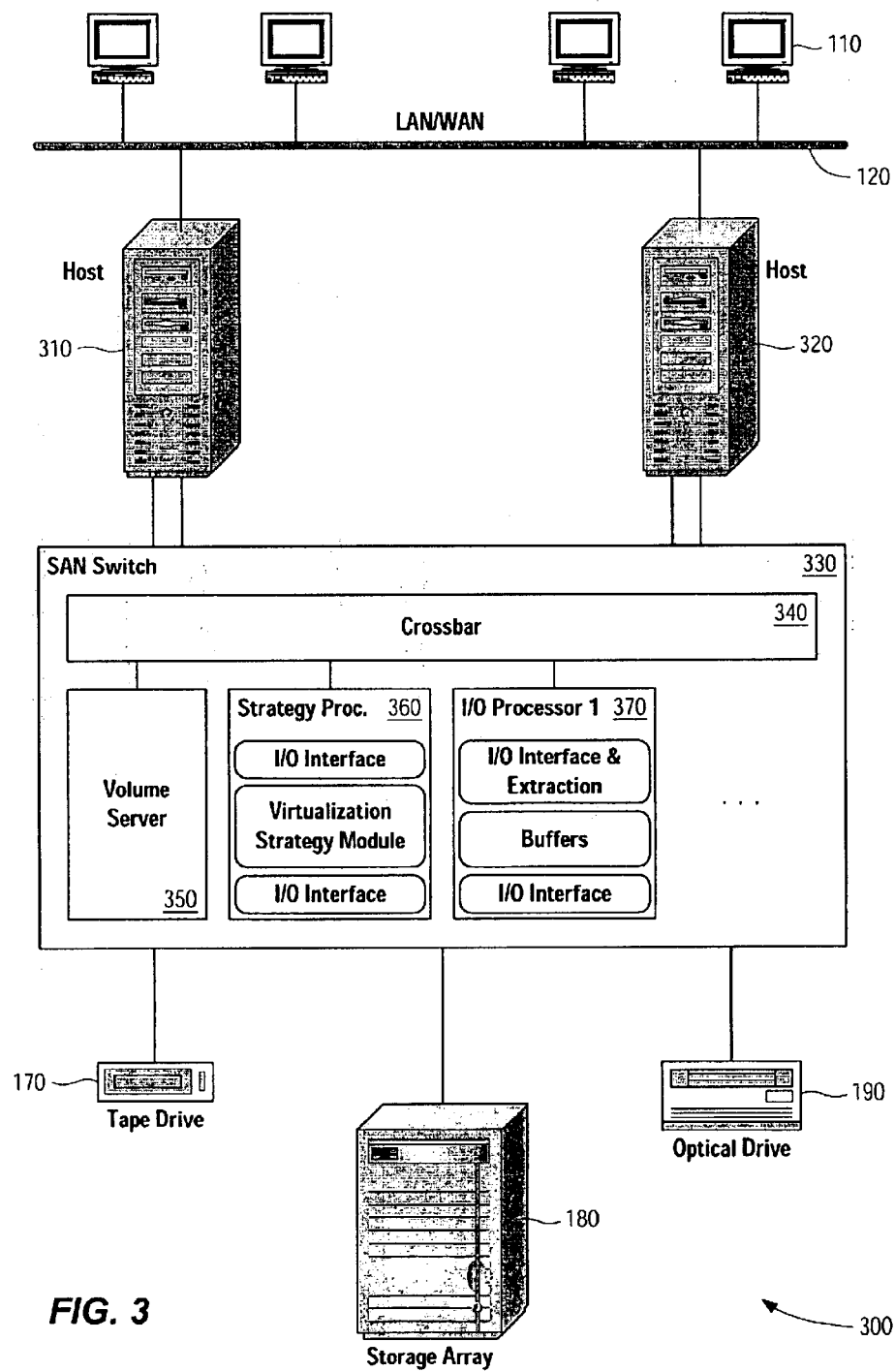
FIG. 3 is a simplified block diagram of computer system including a SAN switch utilizing some of the systems and methods of the present invention.

The systems and methods described above with respect to the host-based virtualization scheme of FIG. 2 can in general be applied to both storage-based and appliance-based storage virtualization devices. FIG. 3 illustrates an example of such an implementation in an in-band, appliance-based storage virtualization system.

FIG. 3 is a simplified block diagram of computer system 300 including a SAN switch 330 utilizing some of the systems and methods of the present invention. Computer system 300 includes two host computer systems, e.g., servers, 310 and 320. Computer system 300 can be implemented as a cluster or may simply include several hosts that may or may not interact. Software operating on hosts 310 and 320 and/or software executing on client computer systems 110 can initiate or request that I/O operations be executed against storage devices such as tape drive 170, storage array 180, and optical drive 190. However, instead of storage virtualization being carried out by one or both of hosts 310 and 320, storage virtualization is provided by SAN switch 330.

SAN switch 330 is an example of a storage appliance that can implement the systems and methods of the present invention. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. As illustrated, SAN switch 330 includes a volume server 350, a strategy processor 360, and one or more I/O processors 370 interconnected by a crossbar switching fabric 340. These elements are merely illustrative, and those having ordinary skill in the are will recognize a variety of other architectures that can be used. For example, instead of crossbar 340, other switching architectures, e.g., single-bus, multiple-bus architectures, and shared-memory architectures, can be used. Additionally, volume server 350, a strategy processor 360, and one or more I/O processors 370 are each typically implemented as software, microcode, or some combination of the two executing on a general-purpose microprocessor, general-purpose microcontroller, ASIC, PLD, FPGA, or the like. In some embodiments, the functionality of two or more of volume server 350, a strategy processor 360, and one or more I/O processors 370 is implemented in the same software and/or hardware. For example, volume server 350 and strategy processor 360 might be combined into a single software package, like volume manager 230 of FIG. 2. Additionally, there can me more than one instantiation of each of volume server 350 and strategy processor 360 in some implementations.

In general, strategy processor 360 serves much the same function as I/O interface 233, virtualization strategy 236, and I/O interface 239 of FIG. 2. Volume server 350 typically implements much of the remaining virtualization functionality that might otherwise be included in volume manager 230. For example, volume server 350 can be responsible for maintaining a complete description of the virtualization scheme, configuring and changing volumes, monitoring one or more strategy processors, and taking control of certain operations under error conditions. Thus in many implementations, volume server 350 is essentially a traditional volume manager tailored for the particular environment of SAN switch 330 and designed to interoperate with strategy processor 360. Although not shown, there is typically at least one I/O processor for each port of SAN switch 330. Each of the I/O processors 370 operates much like I/O processor 270 of FIG. 2. Messages can be passed among various I/O processors 370, strategy processor 360, and volume server 350 via crossbar 340 or using some other communication path (not shown).

Figure 4:
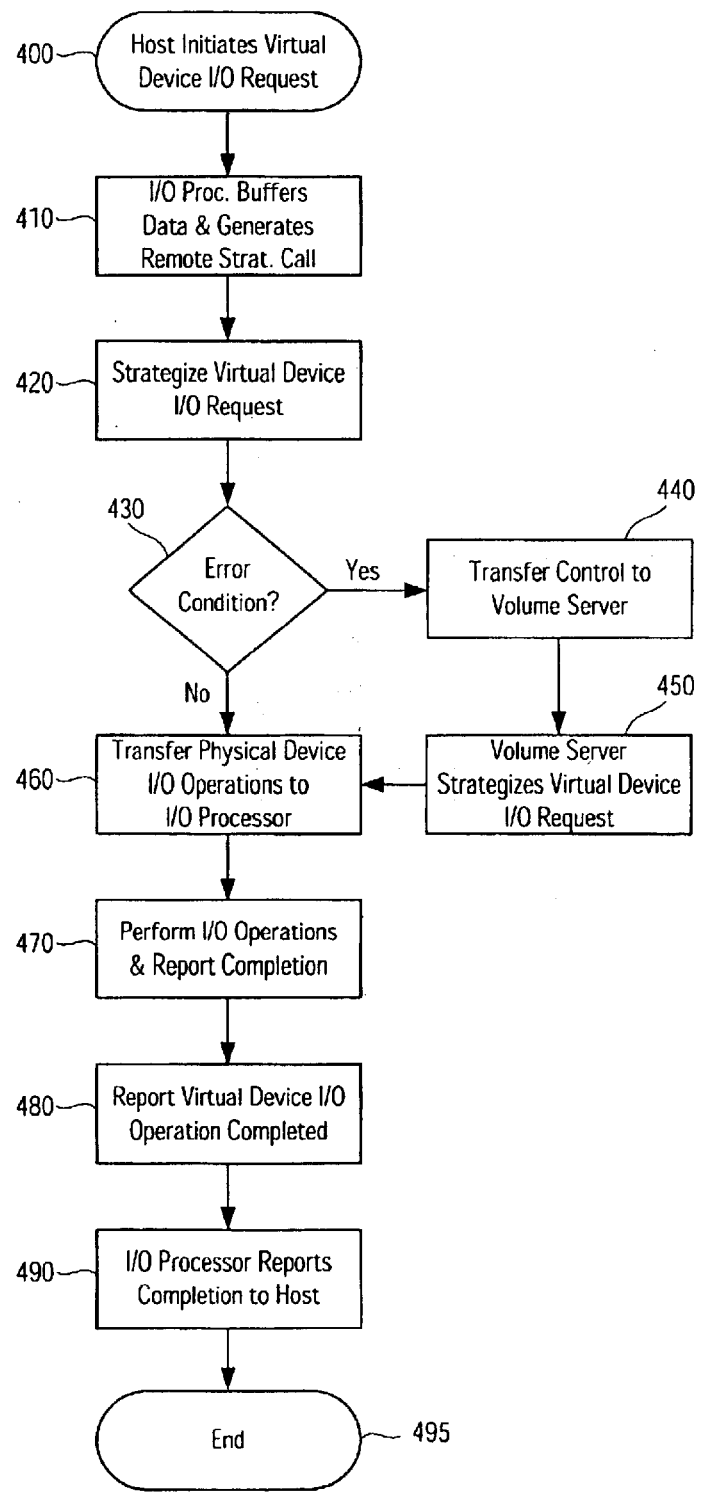
FIG. 4 is a flow chart illustrating techniques of the present invention.

Operation of SAN switch 330 in processing virtual device I/O operation requests is illustrated in greater detail by the flow chart in FIG. 4. Although the processes described in FIG. 4 are specific to the operation of an implementation like that of SAN switch 330, similar process are used in host-based solutions such as that illustrated in FIG. 2.

The process begins when a host initiates a virtual device I/O operation request 400. The source of the request is typically an application, operating system component, or file system process operating on a host computer system such as hosts 310 and 320 or on a client computer system such as client computer systems 110. The virtual device I/O operation request is typically a read and/or write operation directed to a virtual storage device such as a volume or virtual LUN. Such a request can include data to be written or other parameters for use in processing the request. The virtual device I/O operation request is directed to an I/O processor, or perhaps one other software/hardware that includes I/O processor functionality. I/O processors typically expose virtual storage information to the devices, e.g., hosts 310 and 320, coupled to the corresponding ports. The I/O processor buffers any associated data and generates a remote strategy call, not necessarily in that order, as shown in 410. The process of generating a remote strategy call typically includes one or more of, identifying the virtual device destination of the operation, identifying any logical addresses associated with the data subject to the I/O operation request, preparing an appropriate message (e.g., the remote strategy call) that includes this information, and perhaps providing additional information such as setting certain flags.

The remote strategy call is forwarded to the appropriate strategy processor where it is strategized (420), e.g., decomposed into refined physical device I/O operations that, when executed or passed to storage devices, yield the desired virtual device I/O operation. Other operations can also occur at this time. For example, if certain resources need to be locked to complete the operation, or if certain logging tasks should be completed before the operation takes place, the transfer back to the I/O processor of the complete physical device I/O operations can be queued for transmission once any associated tasks are completed. If an error condition occurs, as determined in 430, control of the strategizing can be transferred to the volume server as shown at 440. For example, if an error requiring a configuration change to the virtualization of the storage system occurs, e.g., detaching of a mirror or some other concurrent configuration change, control of the strategizing process can be handed to the volume server. At that point, if the volume server is distinct from the strategy processor, it can assume the role of the strategy processor as well as resolving the error condition, or it may simply resolve the error condition and return control to the strategy processor. In the former case, as illustrated in step 450, the volume server strategies the virtual device I/O operation request and returns the appropriate physical device I/O operations. In an alternate embodiment, error conditions can simply cause the I/O operation to fail, and a message to that effect can be transmitted back to the I/O processor.

Whether by a strategy processor or by a volume server operating as a strategy processor, the physical device I/O operations are transferred back to the corresponding I/O processor (460). In step 470, the I/O operations are performed, typically by transferring the I/O operations to the corresponding physical device. Data to be written to or read from a device can be temporarily stored in buffers associated with each of the I/O processors. Such buffers can be part of memory common to the entire device, memory specific to the I/O processor, or memory shared by multiple I/O processors. Those having skill in the art will readily recognize a variety of different manner in which appropriate data buffering can be performed. Once all of the constituent physical device operations are completed, the I/O processor reports completion of the virtual device I/O operation to the strategy processor and/or to the volume server at 480. Any volume management operations that need to be performed to reflect the I/O operation, e.g., updating storage mapping or transaction logs, can then be performed either by the strategy processor, the volume manager, or some combination of the two. Again, such tasks might require locking or restricting certain resources. The strategy processor and/or the volume server completes these tasks and notifies (not shown) the I/O processor which in turn reports completion of the operation to the host that initiated the operation. Before and/or after the virtual device I/O operation is complete, the I/O processor can transfer back to the host data associated with the operation. In some embodiments, the host can read such data directly from the buffers associated with the I/O processor. The process then terminates at 495. Although not shown, there may be multiple additional messages, acknowledgement messages, transmitted among I/O processors 370, strategy processor 360, and volume server 350.

The flow chart of FIG. 4 illustrates some of the many operational examples of the virtual device I/O operations disclosed in the present application. Those having ordinary skill in the art will readily recognize that certain steps illustrated in FIG. 4 can be eliminated or taken in an alternate order. Moreover, the methods described in FIG. 4 are typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and cluster systems with variations in, for example, the number of nodes, the type of cluster operation (failover, parallel, etc.), the number and type of shared data resources, the number of paths between nodes and shared data resources, and the number and type of coordinator resources.

Figure 5:
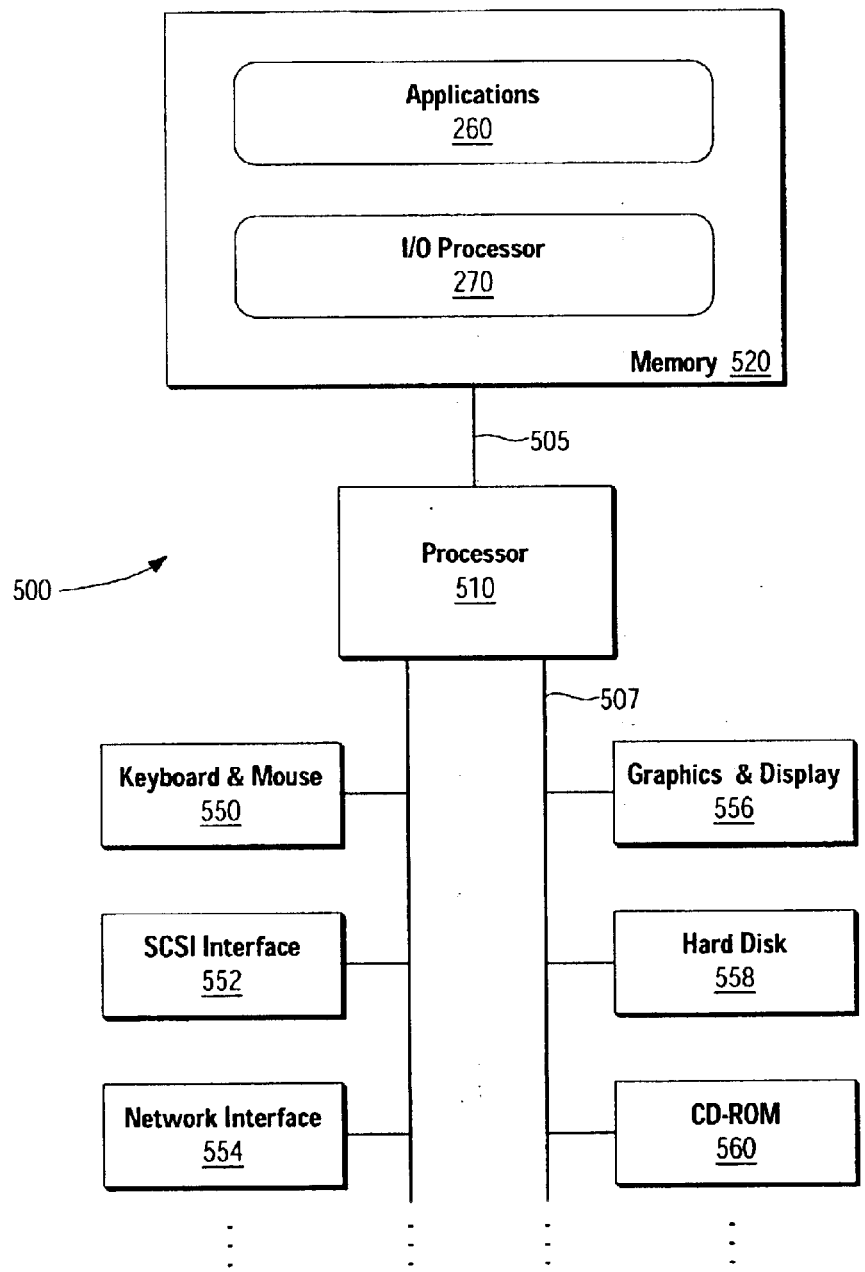
FIG. 5 is a block diagram of a computer system for implementing the techniques of the present invention.

FIG. 5 illustrates a block diagram of a computer system 500 for implementing the fencing techniques of the present invention. For example, computer system 500 can be an embodiment of one of the previously described cluster nodes. Computer system 500 includes a processor 510 and a memory 520 coupled together by communications bus 505. Processor 510 can be a single processor or a number of individual processors working together. Memory 520 is typically random access memory (RAM), or some other dynamic storage device, and is capable of storing instructions to be executed by the processor, e.g., applications 260 and I/O processor 270. Memory 520 is also used for storing temporary variables or other intermediate information during the execution of instructions by the processor 510.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 260 and 270 can be provided to the computer system via a variety of computer readable media including electronic media (e.g., flash memory), magnetic storage media (e.g., hard disk 558, a floppy disk, etc.), optical storage media (e.g., CD-ROM 560), and communications media conveying signals encoding the instructions (e.g., via a network coupled to network interface 554).

Computer system 500 also includes devices such as keyboard & mouse 550, SCSI interface 552, network interface 554, graphics & display 556, hard disk 558, and CD-ROM 560, all of which are coupled to processor 510 by communications bus 507. It will be apparent to those having ordinary skill in the art that computer system 500 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A system comprising:

a first memory;

an input/output (I/O) processor configured to:
receive a virtual device I/O operation request;
store the virtual device I/O operation request in the memory;
form a message using information from the virtual device I/O operation request; and
transmit the message to a strategy processor;

a strategy processor coupled to the I/O processor and configured to receive the message using information from the virtual device I/O operation request and form at least one physical device I/O operation using the information from the virtual device I/O operation request;

a second memory; and a second microprocessor coupled to the second memory, wherein the strategy processor is encoded as instructions stored in the second memory and executable on the second microprocessor, and wherein the first memory and the I/O processor belong to a first computer system and the second memory and the second microprocessor belong to a second computer system, the first computer system being coupled to the second computer system via a network.

2. The system of claim 1 further comprising:

a first microprocessor coupled to the first memory, wherein the I/O processor is encoded as instructions stored in the first memory and executable on the first microprocessor.

3. The system of claim 1 wherein at least a portion of the first memory forms a buffer, the buffer storing data corresponding to the virtual device I/O operation request.

4. The system of claim 1 wherein the information from the virtual device I/O operation request includes a virtual device destination.

5. The system of claim 1 wherein the message includes an indication of a remote I/O operation request.

6. The system of claim 1 further comprising:

information about organization of at least one virtual device, the information about organization of at least one virtual device being stored in the second memory.

7. The system of claim 1 wherein the strategy processor is part of a volume manager.

8. The system of claim 1 wherein the strategy processor is further configured to transfer the at least one physical device I/O operation to the I/O processor for execution.

9. The system of claim 1 further comprising:

at least one storage device coupled to the I/O processor.

* * * * *